(12) United States Patent
Park

(10) Patent No.: US 12,002,629 B2
(45) Date of Patent: Jun. 4, 2024

(54) MULTILAYER ELECTRONIC COMPONENT

(71) Applicant: SAMSUNG ELECTRO-MECHANICS CO., LTD., Suwon-si (KR)

(72) Inventor: Chae Min Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 111 days.

(21) Appl. No.: 17/856,452

(22) Filed: Jul. 1, 2022

(65) Prior Publication Data

US 2023/0238184 A1 Jul. 27, 2023

(30) Foreign Application Priority Data

Jan. 24, 2022 (KR) .................. 10-2022-0010154

(51) Int. Cl.
*H01G 4/30* (2006.01)
*H01G 4/012* (2006.01)
*H01G 4/12* (2006.01)
*H01G 4/224* (2006.01)
*H01G 4/232* (2006.01)

(52) U.S. Cl.
CPC .............. *H01G 4/30* (2013.01); *H01G 4/012* (2013.01); *H01G 4/12* (2013.01); *H01G 4/224* (2013.01); *H01G 4/232* (2013.01)

(58) Field of Classification Search
None
See application file for complete search history.

(56) References Cited

U.S. PATENT DOCUMENTS

| 2004/0064940 | A1* | 4/2004 | Furukawa | H01C 7/008 |
| | | | | 361/708 |
| 2013/0250480 | A1 | 9/2013 | Ahn et al. | |
| 2014/0268485 | A1* | 9/2014 | Kang | H01B 1/22 |
| | | | | 252/512 |
| 2015/0279570 | A1 | 10/2015 | Koga et al. | |
| 2016/0181016 | A1 | 6/2016 | Koga et al. | |
| 2017/0018361 | A1* | 1/2017 | Nishisaka | H01G 4/2325 |
| 2019/0341190 | A1* | 11/2019 | Lee | H01G 4/2325 |

FOREIGN PATENT DOCUMENTS

| JP | 2000-164406 A | 6/2000 |
| JP | 2008-251630 A | 10/2008 |
| KR | 10-1376828 B1 | 3/2014 |
| KR | 10-2016-0042096 A | 4/2016 |
| WO | WO2014/097701 A1 | 1/2017 |

* cited by examiner

*Primary Examiner* — Eric W Thomas

(74) *Attorney, Agent, or Firm* — Morgan, Lewis & Bockius LLP

(57) ABSTRACT

A multilayer electronic component includes a body including a dielectric layer and an internal electrode, an external electrode disposed outside the body, and sealing portions disposed on outer surfaces of the body, wherein the external electrodes and the sealing portions include glass, the sealing portions include first sealing portions that are disposed between the body and the external electrodes, and second sealing portions that extend from the first sealing portions in the second direction and are not in contact with the external electrodes, and an average length of the second sealing portion is 20 μm or more.

20 Claims, 7 Drawing Sheets

MULTILAYER ELECTRONIC COMPONENT

CROSS-REFERENCE TO RELATED APPLICATION(S)

This application claims the benefit of priority to Korean Patent Application No. 10-2022-0010154 filed on Jan. 24, 2022 in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), one of multilayer electronic components, is a chip-type condenser mounted on a printed circuit board of several electronic products such as an image device, for example, a liquid crystal display (LCD), a plasma display panel (PDP) or the like, a computer, a smartphone, and a mobile phone to serve to charge or discharge electricity therein or therefrom. In addition, as an application field of a capacitor has become gradually wider, a demand for miniaturization, a capacitance increase, and high reliability of the capacitor has gradually increased.

Meanwhile, the occurrence of cracks in chips and failures and deterioration of the chips due to moisture permeation have been considered fatal defects. In order to solve such problems, methods such as a method of sealing gaps of chip components or performing with water-repellent coating on surfaces of the chip components have been applied, but it has so far been insufficient to achieve a target high reliability level.

SUMMARY

An aspect of the present disclosure may provide a multilayer electronic component having improved moisture resistance reliability by blocking permeation of moisture or a plating solution.

However, the present disclosure is not limited thereto, and may be more easily understood in a process of describing exemplary embodiments in the present disclosure.

According to an aspect of the present disclosure, a multilayer electronic component may include: a body including a plurality of dielectric layers and a plurality of internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; external electrodes disposed on external surfaces of the body and connected to the internal electrodes; and sealing portions disposed on outer surfaces of the body, wherein the external electrodes and the sealing portions include glass, the sealing portions include first sealing portions that are disposed between the body and the external electrodes, and second sealing portions that extend from the first sealing portions in the second direction and are not in contact with the external electrodes, and an average length of the second sealing portion is 20 μm or more.

According to another aspect of the present disclosure, a multilayer electronic component may include: a body including a plurality of dielectric layers and a plurality of internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction; external electrodes disposed on external surfaces of the body and connected to the internal electrodes; margin parts disposed on opposite end surfaces of the active part in the third direction, respectively; and sealing portions disposed on outer surfaces of the body, wherein the body includes: cover portions disposed on opposite end surfaces of the active part in the first direction, respectively; and diffusion portions in contact with the sealing portions and disposed on inner surfaces of the body, the sealing portions include first sealing portions that are disposed between the body and the external electrodes, and second sealing portions that extend from the first sealing portions in the second direction and are not in contact with the external electrodes, the diffusion portions include first diffusion portions in contact with the first sealing portions and second diffusion portions in contact with the second sealing portions, and the external electrodes, the sealing portions, and the diffusion portions include glass.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
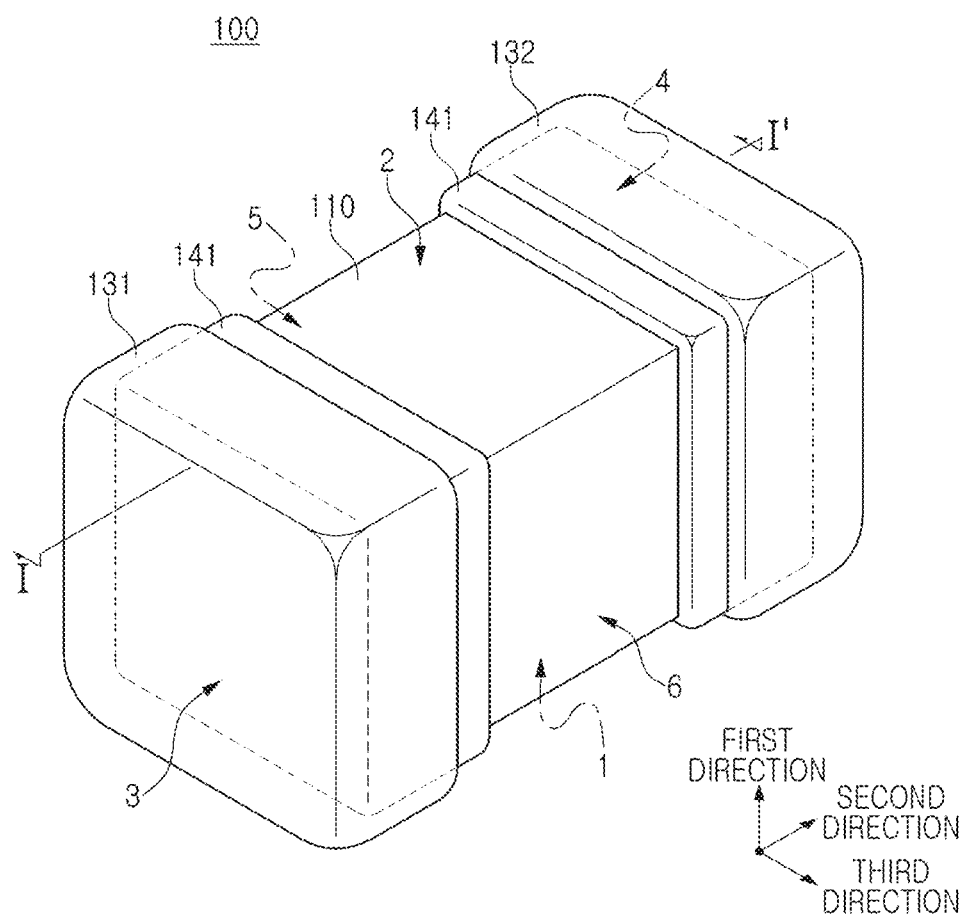
FIG. 1 is a schematic perspective view illustrating a multilayer electronic component according to an exemplary embodiment in the present disclosure.

In the drawings, a first direction may refer to a stacking direction or a thickness T direction, a second direction may refer to a length L direction, and a third direction may refer to a width W direction.

Multilayer Electronic Component

FIG. 1 is a schematic perspective view illustrating a multilayer electronic component according to an exemplary embodiment in the present disclosure.

Figure 2:
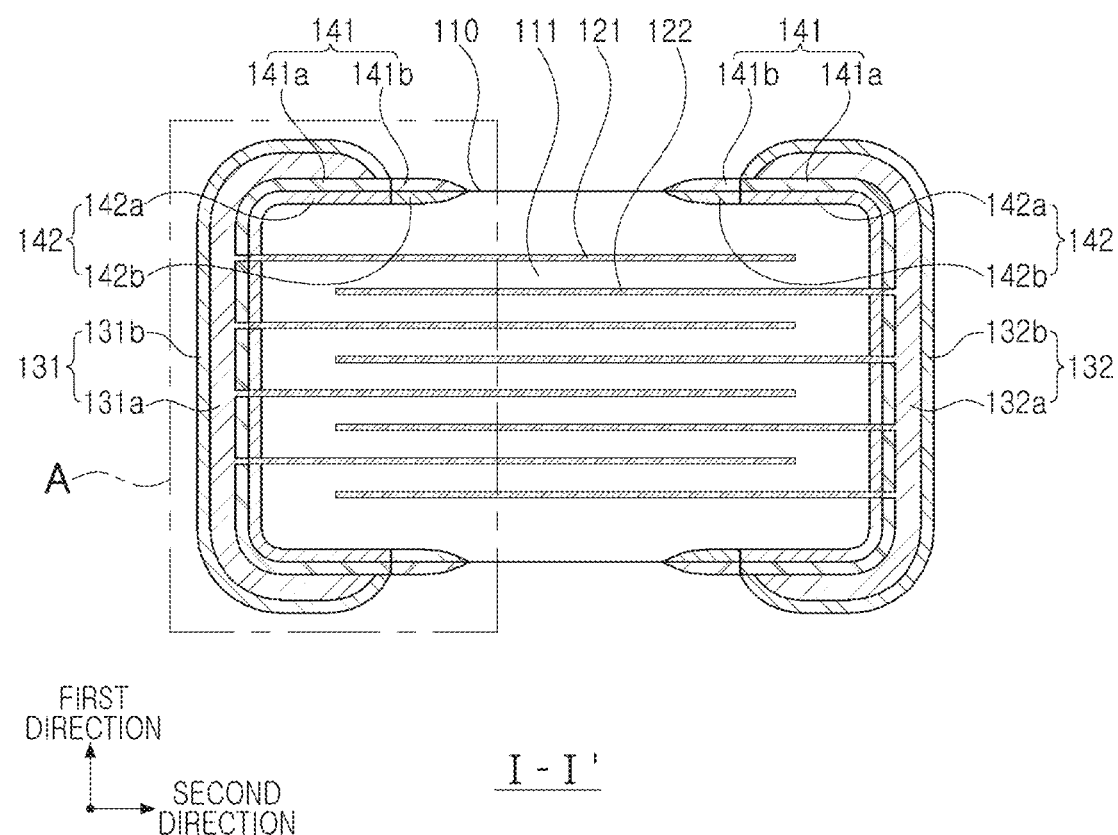
FIG. 2 is a cross-sectional view taken along line I-I' of FIG. 1.

FIG. 2 is a cross-sectional view taken along line I-I' of FIG. 1.

Figure 3:
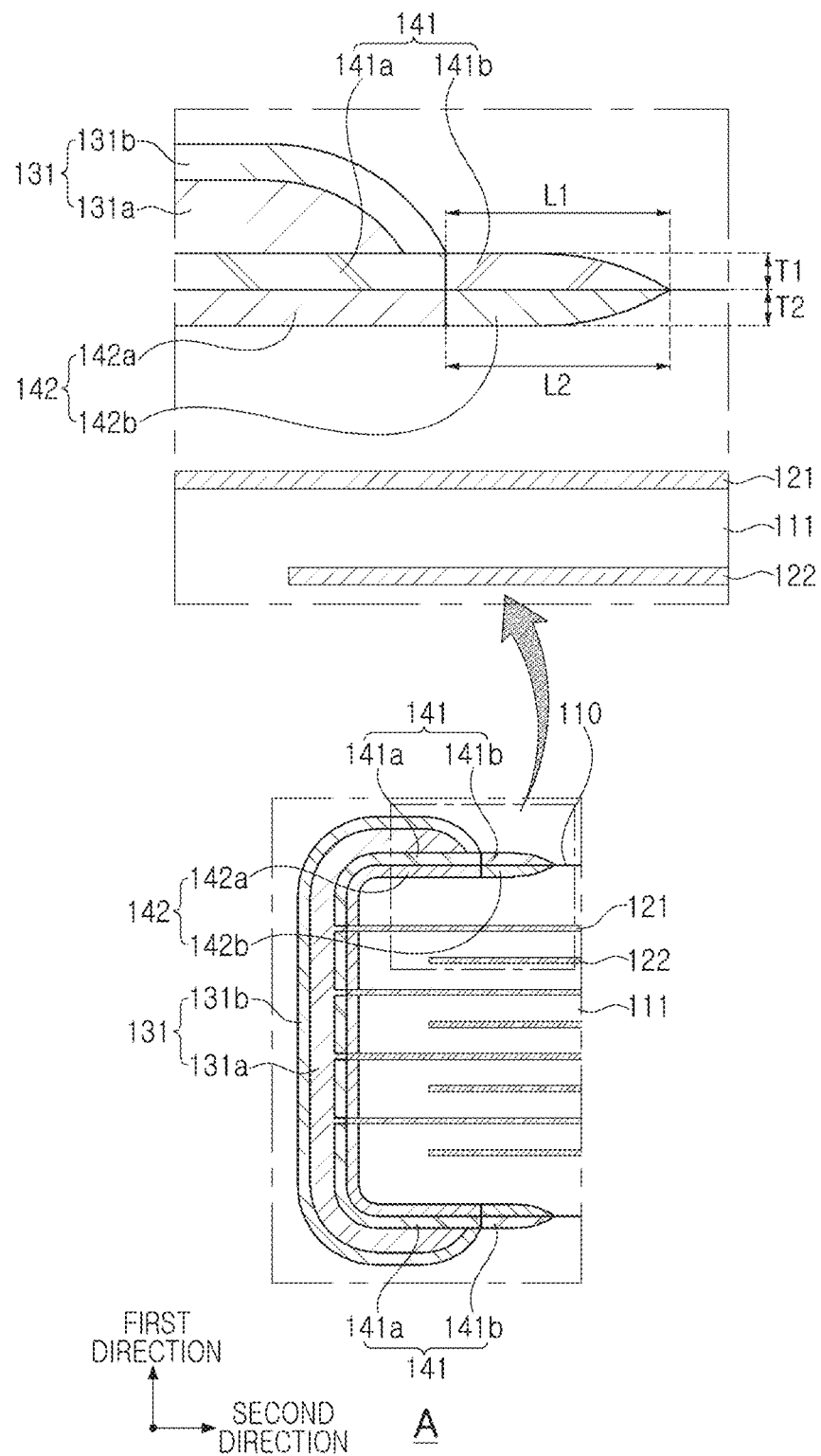
FIG. 3 is an enlarged view of region A of FIG. 2.

FIG. 3 is an enlarged view of region A of FIG. 2.

Figure 4:
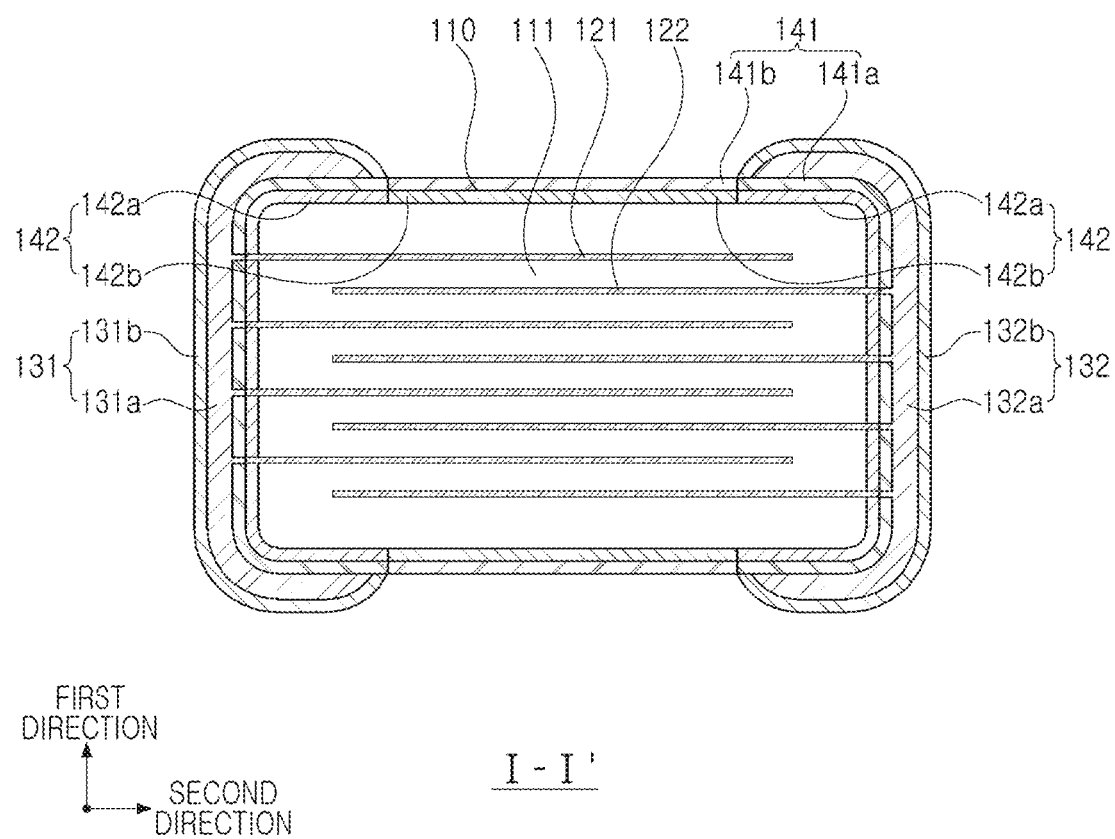
FIG. 4 is a cross-sectional view, in first and second directions (L-T), of the multilayer electronic component in which sealing portions and diffusion portions are disposed on surfaces of a body according to an exemplary embodiment in the present disclosure.

FIG. 4 is a cross-sectional view, in first and second directions (L-T), of the multilayer electronic component in which sealing portions and diffusion portions are disposed on surfaces of a body according to an exemplary embodiment in the present disclosure.

A multilayer electronic component according to an exemplary embodiment in the present disclosure will hereinafter be described in detail with reference to FIGS. 1 through 4.

The multilayer electronic component according to an exemplary embodiment in the present disclosure may include a body including a plurality of dielectric layers and a plurality of internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction, external electrodes disposed on external surfaces of the body and connected to the internal electrodes, and sealing portions disposed on outer surfaces of the body, wherein the external electrodes and the sealing portions include glass, the sealing portions include first sealing portions that are disposed between the body and the external electrodes, and second sealing portions that extend from the first sealing portions in the second direction and are not in contact with the external electrodes, and an average length L1 of the second sealing portion is 20 µm or more.

The body 110 may include a plurality of dielectric layers 111 and internal electrodes 121 and 122 disposed to face each other with each of the dielectric layers 111 interposed therebetween.

A shape of the body 110 is not particularly limited, and may be a hexahedral shape or a shape similar to the hexahedral shape, as illustrated in FIGS. 1 through 4. Although the body 110 does not have a hexahedral shape having perfectly straight lines due to shrinkage of ceramic powders included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces and opposing each other in the third direction.

The plurality of dielectric layers 111 forming the body 110 may be in a sintered state, and adjacent dielectric layers 111 may be integrated with each other so that boundaries therebetween are not readily apparent without using a scanning electron microscope (SEM).

A material of the dielectric layer 111 may be prepared by adding various ceramic additives, organic solvents, plasticizers, binders, dispersing agents, and the like, to powders such as barium titanate ($BaTiO_3$) powders, according to an object of the present disclosure.

Meanwhile, a thickness td of the dielectric layer 111 does not need to be particularly limited. However, the thickness of the dielectric layer 111 may be 0.4 µm or less in order to more easily achieve miniaturization and a capacitance increase of the multilayer electronic component 100. Here, the thickness of the dielectric layer 111 may refer to an average thickness of the dielectric layer 111.

The average thickness of the dielectric layer 111 may be measured from an image obtained by scanning a cross section of the body 110 in the first and second directions (L-T) with a scanning electron microscope (SEM) of 10,000 magnifications. More specifically, an average value may be measured by measuring sizes (thicknesses) of one dielectric layer 111 in the first direction at 30 points positioned at equal intervals in the second direction (length direction) in the obtained image. The 30 points positioned at equal intervals may be designated in an active part Ac. In addition, when average values of ten dielectric layers 111 are measured, an average thickness of the dielectric layer 111 may further be generalized.

Meanwhile, the internal electrodes 121 and 122 may include an active part forming capacitance by including first internal electrode 121 and second internal electrode 122. That is, the body 110 may be formed by alternately stacking dielectric layers 111 on which the first internal electrode 121 is printed and dielectric layers 111 on which the second internal electrode 122 is printed, in the first direction and then sintering the stacked dielectric layers 111.

The first internal electrode 121 may be spaced apart from the fourth surface 4 and be exposed through the third surface 3, and the second internal electrode 122 may be spaced apart from the third surface 3 and be exposed through the fourth surface 4. In addition, the first internal electrode 121 may be exposed through the third, fifth, and sixth surfaces 3, 5, and 6. In this case, the first and second internal electrodes 121 and 122 may be electrically separated from each other by each of the dielectric layers 111 disposed therebetween.

According to the configuration as described above, when predetermined voltages are applied to first and second external electrodes 131 and 132, charges may be accumulated between the first and second internal electrodes 121 and 122. In this case, capacitance of the multilayer electronic component 100 may be proportional to an area of the first and second internal electrodes 121 and 122 overlapping each other along the first direction in the active part.

A material forming the internal electrodes 121 and 122 is not particularly limited, and may include, for example, one or more of nickel (Ni), copper (Cu), palladium (Pd), silver (Ag), gold (Au), platinum (Pt), tin (Sn), tungsten (W), titanium (Ti), and alloys thereof, and the internal electrodes 121 and 122 may be formed using a conductive paste.

A thickness of each of the internal electrodes 121 and 122 does not need to be particularly limited. However, the thickness of each of the internal electrodes 121 and 122 may be 0.4 µm or less in order to more easily achieve miniaturization and a capacitance increase of the multilayer electronic component 100. Here, the thickness of each of the internal electrodes 121 and 122 may refer to an average thickness of each of the internal electrodes 121 and 122.

The average thickness of each of the internal electrodes 121 and 122 may be measured from an image obtained by scanning a cross section of the body 110 in the first and second directions (L-T) with a scanning electron microscope (SEM) of 10,000 magnifications. More specifically, an average value may be measured by measuring sizes (thicknesses) of one internal electrode 121 or 122 in the first direction at 30 points positioned at equal intervals in the second direction (length direction) in the obtained image. The 30 points positioned at equal intervals may be designated in an active part Ac. In addition, when average values of ten internal electrodes 121 or 122 are measured, an average thickness of each of the internal electrodes 121 and 122 may further be generalized.

The external electrodes 131 and 132 may be disposed on the outside surfaces of the body 110, be connected to the internal electrodes 121 and 122, respectively, and disposed on the third and fourth surfaces 3 and 4 of the body 110, respectively.

The external electrodes 131 and 132 may include a first external electrode 131 and a second external electrode 132 connected respectively to the first and second internal electrodes 121 and 122. More specifically, the external electrodes may include a first external electrode 131 disposed on the third surface 3 of the body 110 and a second external electrode 132 disposed on the fourth surface 4 of the body 110. In this case, the second external electrode 132 may be connected to an electric potential different from that of the first external electrode 131.

A structure in which the multilayer electronic component 100 includes two external electrodes 131 and 132 has been described in the present specification, but the number, shapes or the like of external electrodes 131 and 132 may be changed depending on shapes of the internal electrodes 121 and 122 or other purposes.

More specifically, the external electrodes 131 and 132 may include electrode layers 131a and 132a disposed on the body 110, respectively. The electrode layers 131a and 132a may be fired electrodes including a conductive metal and glass, or resin-based electrodes including a conductive metal and a base resin. Alternatively, the electrode layers 131a and 132a may have a form in which fired electrodes and resin electrodes are sequentially formed on the body 110. In addition, the electrode layers 131a and 132a may be formed in a manner of transferring a sheet including a conductive metal onto the body 110 or be formed in a manner of transferring a sheet including a conductive metal onto a fired electrode.

The conductive metal included in the electrode layers 131a and 132a may be a material having excellent electrical conductivity, and may be, for example, one or more selected from the group consisting of nickel (Ni), tin (Sn), copper (Cu), and alloys thereof, but is not particularly limited thereto.

In an exemplary embodiment in the present disclosure, the external electrodes may include a first electrode layer including a first conductive metal and glass and second electrode layer disposed on the first electrode layer and including a second conductive metal and a resin, and the first and the second conductive metals may include one or more selected from the group consisting of copper (Cu), nickel (Ni), palladium (Pd), silver (Ag), and alloys thereof.

The external electrodes 131 and 132 may be formed of any material having electrical conductivity, such as a metal, a specific material of each of the external electrodes 131 and 132 may be determined in consideration of electrical characteristics, structural stability and the like, and the external electrodes 131 and 132 may have a multilayer structure.

Meanwhile, the glass may serve to improve bondability and moisture resistance of the external electrodes 131 and 132. That is, adhesion may be maintained between the electrode layers 131a and 132a of the external electrodes and the dielectric layers 111 of the body 110 by a glass component.

The glass may be a composition in which oxides are mixed with each other, and may be one or more selected from the group consisting of silicon oxide, boron oxide, aluminum oxide, transition metal oxide, alkali metal oxide, and alkaline earth metal oxide, but is not particularly limited thereto.

Plating layers 131b and 132b may serve to improve mounting characteristics of the multilayer electronic component. A type of the plating layers 131b and 132b is not particularly limited, and each of the plating layers 131b and 132b may be a plating layer including one or more of nickel (Ni), tin (Sn), palladium (Pd), and alloys thereof, and may be formed as a plurality of layers.

As a more specific example of the plating layers 131b and 132b, the plating layers 131b and 132b may be Ni plating layers or Sn plating layers, may have a form in which Ni plating layers and Sn plating layers are sequentially formed on the electrode layers 131a and 132a, respectively, or may have a form in which Sn plating layers, Ni plating layers, and Sn plating layers are sequentially formed. Alternatively, the plating layers 131b and 132b may include a plurality of Ni plating layers and/or a plurality of Sn plating layers.

Meanwhile, sealing portions 141 may be disposed on outer surfaces of the body 110.

Referring to FIGS. 1 through 4, the sealing portions 141 may be disposed on portions or the entirety of the outer surfaces of the body 110, may be disposed in a different shape if necessary or depending on a manufacturing method thereof, and may be disposed in the form of layers having a predetermined thickness between the body and the external electrodes.

More specifically, in the sealing portions 141, the glass component included in the external electrodes 131 and 132 may be disposed along the outer surfaces of the body 110 according to a firing heat treatment condition of the external electrodes, a surface state of the body, and the like. That is, the sealing portions 141 may include the glass component. In addition, the sealing portions 141 may include first sealing portions 141a disposed at interfaces between the body 110 and the external electrodes 131 and 132 and second sealing portions 141b that are not in contact with the external electrodes 131 and 132. That is, the first sealing portions 141a may be disposed on the third and fourth surfaces 3 and 4 and portions of the first, second, fifth, and sixth surfaces 1, 2, 5, and 6 of the body 110, and the second sealing portions 141b may be disposed on portions of the first, second, fifth, and sixth surfaces 1, 2, 5, and 6 on which the external electrodes 131 and 132 are not disposed. In this case, the sealing portions 141 disposed on the third and fourth surfaces 3 and 4 may not be disposed at portions where the internal electrodes 121 and 122 and the external electrodes 131 and 132 are connected to each other, respectively. This is for the external electrodes 131 and 132 including the conductive material to be electrically connected to the internal electrodes 121 and 122, respectively.

The sealing portions 141 may close or seal portions such as cracks and pores existing in the surfaces of the body to block external moisture, a plating solution or the like from permeating into the body 110, and thus improve moisture resistance reliability of the multilayer electronic component 100.

In the related art, a method of blocking a moisture permeation path or permeation of a plating solution by increasing a thickness and a length of the external electrodes in order to improve the moisture resistance reliability has been applied, but there was a problem in improving the moisture resistance reliability due to miniaturization and a capacitance increase of the multilayer electronic component, and there was a problem that it is difficult to control a material. In addition, a method of improving the moisture resistance reliability by disposing sealing portions in gaps between the outer surfaces of the body and distal ends of the external electrodes has been attempted, but an area of the sealing portions is small or the sealing portions are separately coated on the outer surfaces of the body, and thus, target moisture resistance reliability improvement was not achieved.

In an exemplary embodiment in the present disclosure, the sealing portions 141 may include not only the first sealing portions 141a disposed between the external electrodes 131 and 132 and the body 110, but also the second sealing portions 141b disposed to further extend to portions of the outer surfaces of the body 110 that are not in contact with the external electrodes 131 and 132 to block permeation of moisture, and thus improve the moisture resistance reliability of the multilayer electronic component 100.

The first sealing portions 141a may be disposed at the interfaces between the external electrodes 131 and 132 and the body 110. In this case, an average thickness of the first sealing portion 141a may be 1 μm or more. However, the average thickness of the first sealing portion 141a is not particularly limited thereto, and may vary depending on a content of the glass component included in the external electrode, a manufacturing method of the first sealing portion, or the like. More specifically, the average thickness of the first sealing portion 141a may be equal to or less than a size (thickness) of each of the external electrodes 131 and 132 in the first direction.

Meanwhile, the average thickness of the first sealing portion may be measured from an image obtained by scanning a cross section in the first and second directions (L-T) with a scanning electron microscope (SEM) of 10,000 magnifications. More specifically, an average value may be calculated by measuring sizes (thicknesses) of the first sealing portion in the first direction at 30 points positioned at equal intervals in the second direction in the obtained image. The 30 points positioned at equal intervals may be designated in one of four first sealing portions in contact with the external electrodes disposed in the second direction and the body in first to fourth quadrant images divided from the image of the cross section in the first and second directions (L-T) with the first and second directions as an axis. In addition, when average values of the four first sealing portions are measured, an average thickness of the first sealing portion may further be generalized.

The second sealing portions 141b may be disposed in the second direction from distal ends of the external electrodes 131 and 132, and may be formed on portions of the first, second, fifth, and sixth surfaces 1, 2, 5, and 6 of the body. In this case, an average thickness T1 of each of the second sealing portions at the distal ends of the external electrodes 131 and 132 may be 1 μm or more, and an average length L1 of each of the second sealing portions may be 20 μm or more.

When the average thickness T1 of each of the second sealing portions is less than 1 μm, moisture or the like may permeate between the external electrodes 131 and 132 and the outer surface of the body 110, such that it may be difficult to improve the moisture resistance reliability of the multilayer electronic component 100. An upper limit of T1 is not particularly limited, and may vary depending on a size of the multilayer electronic component 100 and may vary depending on a firing heat treatment condition, a component or the like of the external electrodes 131 and 132. More specifically, the upper limit of T1 may be equal to or less than the size (thickness) of the external electrodes 131 and 132 in the first direction.

Meanwhile, the average thickness T1 of each of the second sealing portions at the distal ends of the external electrodes 131 and 132 may be measured from an image obtained by scanning the cross section in the first and second directions (L-T) with the scanning electron microscope (SEM) of 10,000 magnifications. More specifically, an average value may be calculated by measuring sizes (thicknesses) of the second sealing portion in the first direction at 30 points positioned at equal intervals in the third direction in the image obtained by scanning the cross section in the first and second directions (L-T). In addition, when average values of thicknesses of the second sealing portions at the distal ends of the external electrodes positioned on upper and lower surfaces of the body in the cross section in the first and second directions (L-T) are calculated, the average thickness T1 of the second sealing portion may further be generalized.

In addition, when the average length L1 of the second sealing portion is less than 20 μm, moisture or the like may permeate between the external electrodes and the surfaces of the body, such that it may be difficult to improve the moisture resistance reliability of the multilayer electronic component. An upper limit of L1 is not particularly limited and may vary depending on the size of the multilayer electronic component, and the second sealing portions may be disposed to cover the entirety of the outer surfaces of the body 100 on which the external electrodes 131 and 132 are not disposed.

Meanwhile, the average length L1 of the second sealing portion may be measured from the image obtained by scanning the cross section in the first and second directions (L-T) with the scanning electron microscope (SEM) of 10,000 magnifications. More specifically, when the obtained image is divided into first to fourth quadrants with the first and second directions as an axis, the second sealing portions may exist in the first to fourth quadrants, and an average value may be measured by measuring a maximum length of the four second sealing portions. In addition, the average length L1 of the second sealing portion may be measured by measuring a cross section in the second and third directions (L-W) on the image captured by the SEM, and a method of measuring the average length L1 of the second sealing portion is the same as that described above in the cross section in the first and second directions (L-T). The average length L1 of the second sealing portion may be further generalized by measuring lengths of the second sealing portion on cross sections in the first and second directions (L-T) and the second and third directions (L-W).

Meanwhile, a thickness of a diffusion portion, which is a glass layer diffused in the body, may not be readily apparent only with a scanning electron microscope (SEM) analysis method, the diffusion portion may be observed with an optical microscope after the cross section of the body in the first and second directions (L-T) or a cross section of a cover portion in the second and third directions (L-W) is processed by polishing, and the thickness of the diffusion portion may be measured in a dark-field image mode of the optical microscope, if necessary. The lengths or the thicknesses of the sealing portion and the diffusion portions described in the present specification may also be observed through the method of measuring the length or the thickness described above.

According to an exemplary embodiment in the present disclosure, the average thickness of the second sealing portion may become smaller as the second sealing portion becomes more distant from the first sealing portion in the second direction.

That is, the average thickness of each of the second sealing portions 141b may decrease as the second sealing portions 141b become more distant from the distal ends of the external electrodes 131 and 132 in the second direction.

This is a difference due to a manufacturing method in which the glass component of the external electrodes 131 and 132 is disposed on the outer surfaces of the body 110 and the thickness decreases as the glass component exits and becomes more distant from the external electrodes 131 and 132, but the second sealing portions are not particularly limited to having a shape in which the thickness thereof decreases.

A method of measuring the average thickness of the second sealing portion is the same as the method of measuring the average thickness of each of the second sealing portions at the distal ends of the external electrodes described above, and a description thereof is thus omitted.

Meanwhile, the body 110 may include diffusion portions 142 disposed on inner surfaces of the body 110 in contact with the sealing portions 141.

Referring to FIGS. 2 through 4, the diffusion portions 142 may be disposed on portions or the entirety of the inner surfaces of the body 110, may be disposed in a different shape if necessary or depending on a manufacturing method thereof, and may be disposed in the form of layers having a predetermined size on surfaces of the body 110 in contact with the external electrodes 131 and 132. In this case, the diffusion portions 142 disposed on the third and fourth surfaces 3 and 4 may not be disposed at portions where the internal electrodes 121 and 122 and the external electrodes 131 and 132 are connected to each other, respectively. This may be for the external electrodes 131 and 132 including the conductive material to be electrically connected to the internal electrodes 121 and 122, respectively.

More specifically, in the diffusion portions 142, the glass component included in the external electrodes 131 and 132 may be disposed along the inner surfaces of the body according to the firing heat treatment condition of the external electrodes, the surface state of the body, and the like. That is, the diffusion portions may include the glass component.

In this case, the glass of the diffusion portion 142 may be disposed at a dielectric crystal grain boundary. The glass may be disposed at the dielectric crystal grain boundary to fill defects such as pores and thus block open channels connected from the inside of the body to the outside of the body from being formed.

That is, the diffusion portions 142 may block external moisture, a plating solution or the like from permeating into the body to improve the moisture resistance reliability of the multilayer electronic component 100, similar to the sealing portions 141.

In addition, the diffusion portions 142 may include first diffusion portions 142a disposed on the inner surfaces of the body 110 and in contact with the first sealing portions 141a and second diffusion portions 142b disposed on the inner surface of the body 110, extending from the first diffusion portions 142a in the second direction, and in contact with the second sealing portions 141b. That is, the first diffusion portions 142a may be disposed on the third and fourth surfaces 3 and 4 and the first, second, fifth, and sixth surfaces 1, 2, 5, and 6 of the body. The second diffusion portions 142b may be disposed on the first, second, fifth, and sixth surface 1, 2, 5, and 6 of the body 110 on which the external electrodes 131 and 132 are not disposed among the outer surfaces of the body 110 and which is in contact with the second sealing portions 141b.

An average thickness of the first diffusion portion 142a may be 5 µm or more. However, the average thickness of the first diffusion portion 142a is not particularly limited thereto, and may vary depending on a content of the glass component included in the external electrode, a manufacturing method of the first diffusion portion, and the like.

Meanwhile, the average thickness of the first diffusion portion may be measured from an image obtained by scanning a cross section in the first and second directions (L-T) with a scanning electron microscope (SEM) of 10,000 magnifications. More specifically, an average value may be calculated by measuring sizes (thicknesses) of the first diffusion portion in the first direction at 30 points positioned at equal intervals in the second direction in the obtained image. The 30 points positioned at equal intervals may be designated in four first diffusion portions in contact with the first sealing portions in first to fourth quadrant images divided from the image of the cross section in the first and second directions (L-T) with the first and second directions as an axis. In addition, when average values of the four first diffusion portions are measured, the average thickness of the first diffusion portion may further be generalized.

The second diffusion portions 142b may be disposed on the inner surfaces of the body 110 in contact with the second sealing portions 141b. In this case, an average thickness T2 of each of the second diffusion portions 142b at the distal ends of the external electrodes may be 5 µm or more.

When the average thickness T2 of each of the second diffusion portions at the distal ends of the external electrodes is less than 5 µm, moisture or the like may permeate between the external electrodes 131 and 132 and the outer surface of the body 110, such that it may be difficult to improve the moisture resistance reliability of the multilayer electronic component 100. An upper limit of T2 is not particularly limited, and may vary depending on a size of the multilayer electronic component 100 and may vary depending on the firing heat treatment condition, the component or the like of the external electrodes.

Meanwhile, a method of measuring the average thickness T2 of each of the second diffusion portions at the distal ends of the external electrodes may be the same as the method of measuring the average thickness T1 of each of the second sealing portions at the distal ends of the external electrodes described above, and a description thereof is thus omitted.

Meanwhile, an average length L2 of the second diffusion portion may vary depending on the average length L1 of the second sealing portion and may be a length at which |L1−L2|≤1 µm, but is not particularly limited thereto, and the average length L2 of the second diffusion portion may vary depending on the firing heat treatment condition of the external electrodes and a manufacturing method of the second diffusion portion.

In an exemplary embodiment in the present disclosure, the average thickness of the second diffusion portion 142b may become smaller as the second sealing portion becomes more distant from the first diffusion portion 142a in the second direction.

That is, the average thickness of each of the second diffusion portions 142b may decrease as the second diffusion portions 142b become more distant from the distal ends of the external electrodes 131 and 132 in the second direction.

Meanwhile, a method of measuring the average thickness of the second diffusion portion is the same as the method of measuring the average thickness of each of the second sealing portions at the distal ends of the external electrodes described above, and a description thereof is thus omitted.

Figure 5A:
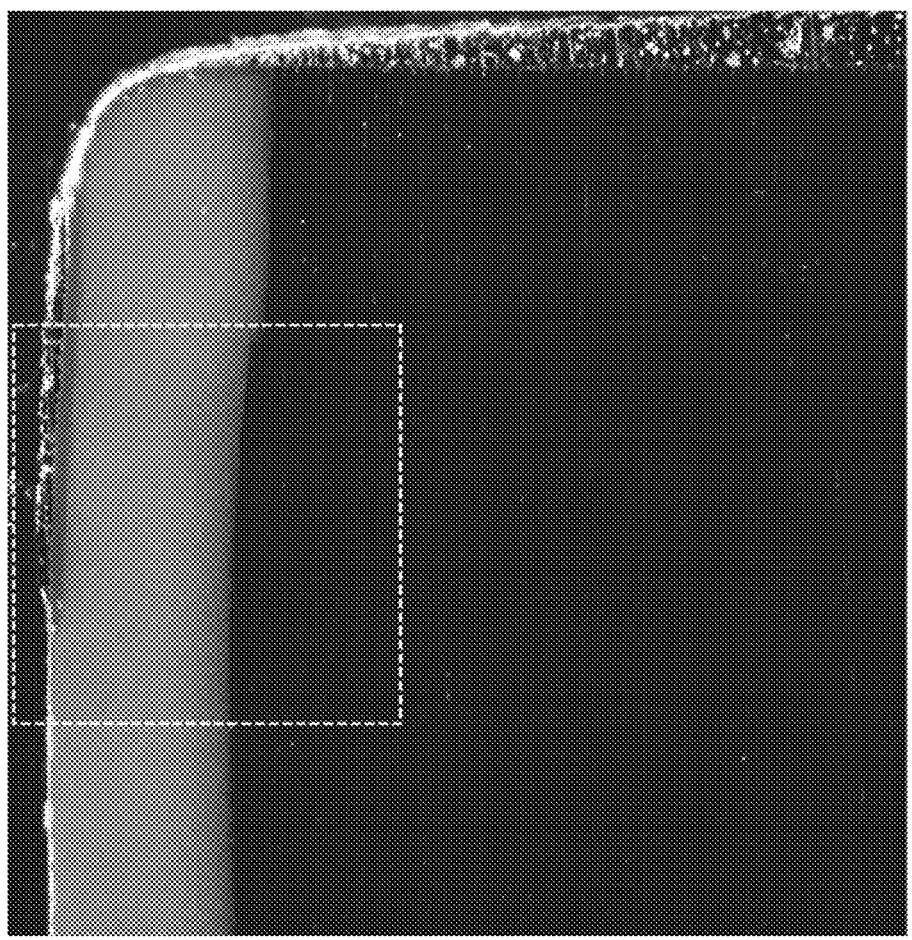
FIG. 5A is an image, captured by a scanning electron microscope (SEM), of the multilayer electronic component including the sealing portions and the diffusion portions according to an exemplary embodiment in the present disclosure.
Figure 5B:
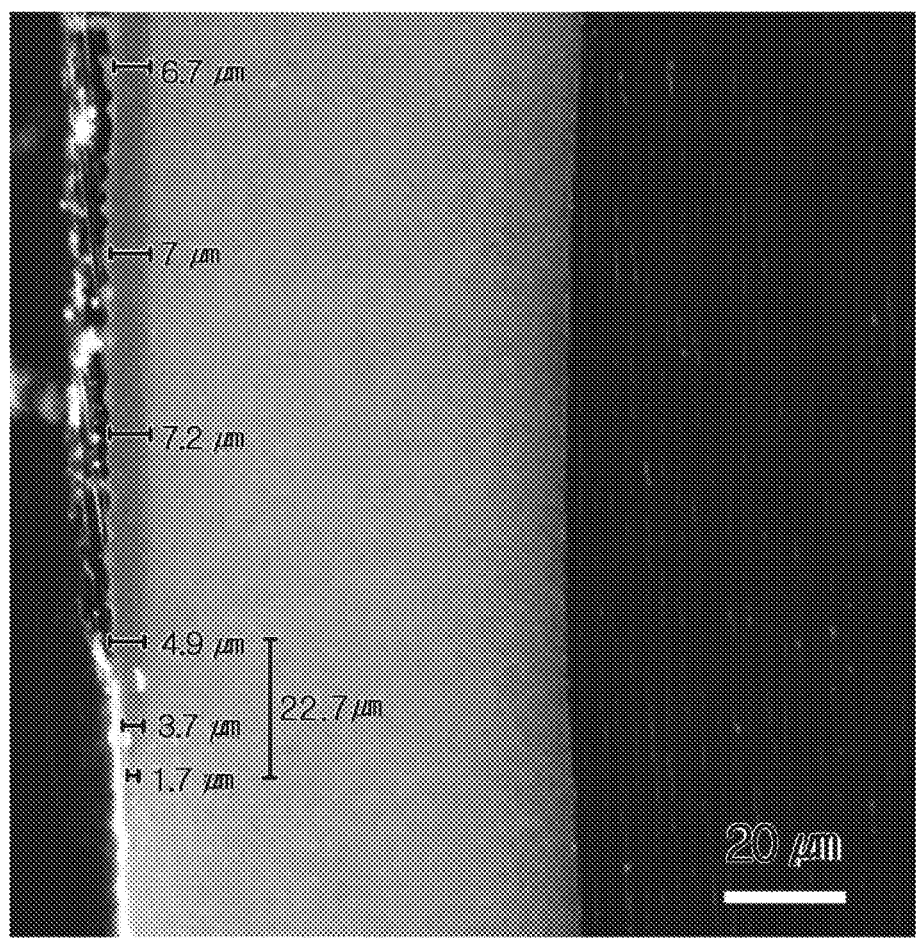
FIG. 5B is an enlarged image of a partial area of FIG. 5A.
Figure 6:
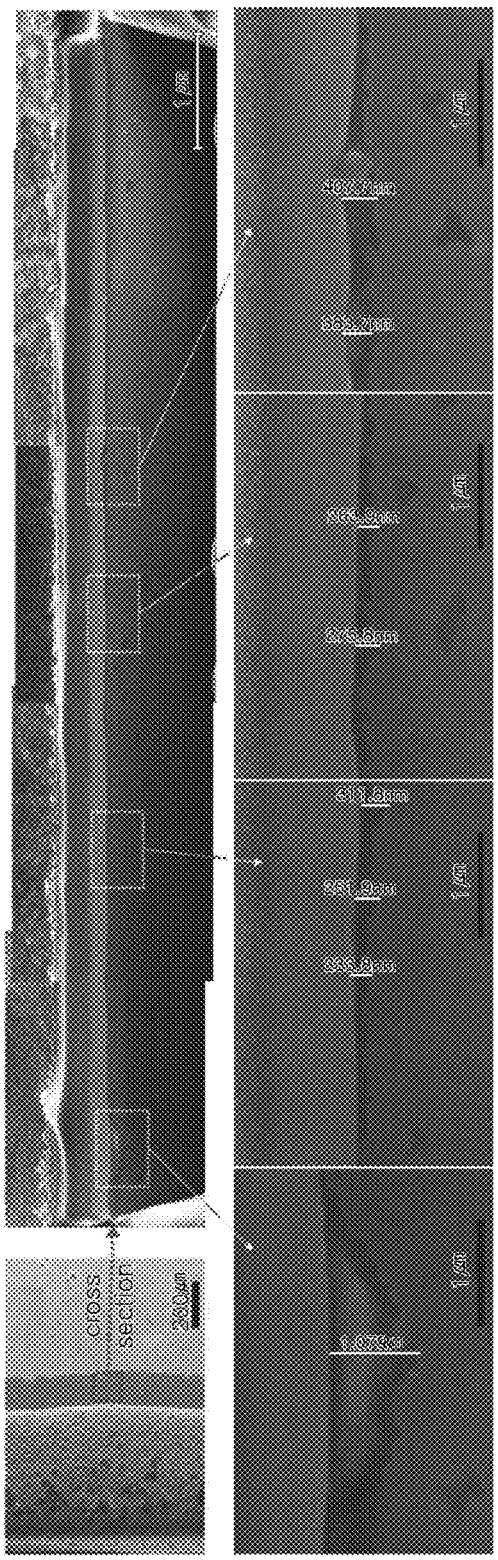
FIG. 6 is an image, captured by an SEM, of the multilayer electronic component including the sealing portions and the diffusion portions according to an exemplary embodiment in the present disclosure.

FIG. 5A is an image, captured by a scanning electron microscope (SEM), of the multilayer electronic component including the sealing portions and the diffusion portions according to an exemplary embodiment in the present disclosure, FIG. 5B is an enlarged image of a partial area of FIG. 5A, and FIG. 6 is an image, captured by an SEM, of the multilayer electronic component including the sealing portions and the diffusion portions according to an exemplary embodiment in the present disclosure.

First, referring to FIGS. 5A and 5B, it can be seen that the first and second diffusion portions 142a and 142b are disposed on the inner surface of the body 100, a thickness of each of the first and second diffusion portions 142a and 142b is 1 µm or more, and a size (length) of each of the second sealing portion 141b and the second diffusion portion 142b in the second direction is 20 µm or more. Referring to FIG. 6, the glass component may be disposed on a non-smooth surface or pores of the body to prevent open channels connected from the inside of the body to the outside of the body from being formed.

In an exemplary embodiment in the present disclosure, the body 110 may include an active part forming capacitance by including the dielectric layers 111 and the internal electrodes 121 and 122 alternately disposed in the first direction and cover portions disposed on opposite surfaces 1 and 2 of the active part in the first direction, respectively, and may further include margin parts disposed on opposite surfaces 5 and 6 of the active part in the third direction, respectively.

More specifically, the body 110 may include the active part disposed therein and forming capacitance by including first internal electrodes 121 and second internal electrodes 122 disposed to face each other with each of the dielectric layers 111 interposed therebetween and upper and lower cover portions formed on upper and lower surfaces of the active part in the first direction, respectively.

The active part, which contributes to forming the capacitance of the multilayer electronic component 100, may be formed by repeatedly stacking a plurality of first and second internal electrodes 121 and 122 with each of the dielectric layers 111 interposed therebetween.

The upper cover portion and the lower cover portion may be formed by stacking a single dielectric layer 111 or two or more dielectric layers 111 on the upper and lower surfaces 5 and 6 of the active part, respectively, in the first direction (thickness direction), and may basically serve to prevent damage to the internal electrodes 121 and 122 due to physical or chemical stress.

The upper cover portion and the lower cover portion may not include the internal electrodes 121 and 122, and may include the same material as the dielectric layer 111. That is, the upper cover portion and the lower cover portion may include a ceramic material such as a barium titanate (BaTiO$_3$)-based ceramic material.

Meanwhile, a thickness of the cover portion does not need to be particularly limited. However, an average size of the cover portion in the first direction may be 20 µm or less in order to more easily achieve miniaturization and a capacitance increase of the multilayer electronic component. Here, the average size of the cover portion in the first direction may refer to an average thickness of the cover portion.

The average thickness of the cover portion may be measured from the image obtained by scanning the cross section of the body 110 in the first and second directions (L-T) with the scanning electron microscope (SEM) of 10,000 magnifications. More specifically, an average value may be measured by measuring sizes (thicknesses) of the cover portion in the first direction at 30 points positioned at equal intervals in the second direction (length direction) in the obtained image. In addition, when average thicknesses of the upper cover portion and the lower cover portion are measured, the average thickness of the cover portion may further be generalized.

The margin parts may include a first margin part disposed on the fifth surface 5 of the body 110 and a second margin part disposed on the sixth surface 6. That is, the margin parts may be disposed on opposite end surfaces of the body 110 in the third direction, respectively.

The margin parts may basically serve to prevent damage to the internal electrodes 121 and 122 due to physical or chemical stress. The margin parts may be formed by stacking ceramic green sheets to form a laminate, cutting the laminate so that the internal electrodes 121 and 122 are exposed to the fifth and sixth surfaces 5 and 6 of the body, and then stacking a single dielectric layer 111 or two or more dielectric layers 111 on the opposite end surfaces of the active part in the third direction, in order to suppress a step due to the internal electrodes 121 and 122.

The margin parts may not include the internal electrodes 121 and 122, and may include the same material as the dielectric layer 111. That is, the first margin part and the second margin part may include a ceramic material such as a barium titanate (BaTiO$_3$)-based ceramic material.

Meanwhile, a thickness of the margin part does not need to be particularly limited. However, an average size of the margin part in the third direction may be 20 µm or less in order to more easily achieve miniaturization and a capacitance increase of the multilayer electronic component. Here, the average size of the margin part in the third direction may refer to an average width of the margin part.

The average width of the margin part may be measured from the image obtained by scanning the cross section of the body 110 in the first and third directions (W-T) with the scanning electron microscope (SEM) of 10,000 magnifications. More specifically, an average value may be measured by measuring sizes (widths) of the margin part in the third direction at 30 points positioned at equal intervals in the first direction in the obtained image. In addition, when average values of the first and second margin parts are measured, the average width of the margin part may further be generalized.

A size of the multilayer electronic component 100 described in the present specification need not be particularly limited. However, since the numbers of stacked dielectric layers and internal electrodes need to be increased by decreasing thicknesses of the dielectric layers 111 and the internal electrodes 121 and 122 in order to achieve both the miniaturization and the capacitance increase of the multilayer electronic component, a reliability improvement effect according to the present disclosure in a multilayer electronic component 100 having a size of 0402 (length×width: 0.4 mm×0.2 mm) or less may become more remarkable.

Hereinafter, the present disclosure will be described in more detail through Examples. However, they are to assist in the detailed understanding of the present disclosure, and the scope of the present disclosure is not limited by Examples.

EXAMPLE

A length of the second sealing portion was measured in the cross section of the body in the first and second directions (L-T) or the cross section of the cover portion in the second and third directions (L-W), and was measured at a portion formed of only the glass component formed in the second direction from the distal end of the external electrode including copper (Cu) on the outer surface of the body. In this case, the length of the second sealing portion was measured through focused ion beam (FIB) ion-milling, which is a type of cross section analysis method.

In Comparative Example, the sealing portions and the diffusion portions were not formed in sample chips because the glass was not included in a paste for an external electrode.

In Inventive Examples, which are exemplary embodiments in the present disclosure in which the sealing portions and the diffusion portions are formed because the glass is included in a paste for an external electrode, a heat treatment temperature condition was that t1<t2<t3.

Table 1 is data showing that a length of the second sealing portion varies depending on a paste composition and a heat treatment temperature. 20 sample chips were manufactured for each of Inventive Examples or Comparative Example, lengths of the second sealing portions in cross sections of bodies in first and second directions (L-T) in 10 sample chips were measured, and lengths of the second sealing portions in cross sections of cover portions in second and third directions (L-W) in the other 10 sample chips were measured.

TABLE 1

| Sample Chip | | Inventive Example 1 | Inventive Example 2 | Inventive Example 3 | Comparative Example 1 |
|---|---|---|---|---|---|
| Division | Paste | A | A | A | B |
| | Heat Treatment Condition | t1 | t2 | t3 | t3 |
| Length of Second Sealing portion in Cross section of Body in First and Second Directions (L-T) | 1 | 21 | 31 | 42 | 0 |
| | 2 | 19 | 37 | 43 | 0 |
| | 3 | 18 | 29 | 31 | 0 |
| | 4 | 23 | 25 | 29 | 0 |
| | 5 | 19 | 38 | 50 | 0 |
| | 6 | 23 | 38 | 53 | 0 |
| | 7 | 19 | 33 | 60 | 0 |
| | 8 | 21 | 39 | 70 | 0 |
| | 9 | 18 | 30 | 46 | 0 |
| | 10 | 17 | 32 | 39 | 0 |
| Length of Second Sealing portion in Cross section of Cover portion in Second and Third Directions (L-W) | 11 | 14 | 30 | 44 | 0 |
| | 12 | 24 | 30 | 43 | 0 |
| | 13 | 16 | 34 | 51 | 0 |
| | 14 | 17 | 31 | 45 | 0 |
| | 15 | 21 | 19 | 44 | 0 |
| | 16 | 18 | 18 | 48 | 0 |
| | 17 | 20 | 25 | 42 | 0 |
| | 18 | 22 | 30 | 42 | 0 |
| | 19 | 20 | 31 | 49 | 0 |
| | 20 | 21 | 36 | 45 | 0 |
| Average Length (μm) of Second Sealing portion | | 20 | 31 | 46 | 0 |

Referring to Table 1, it can be seen that in Inventive Examples 1 to 3 in which glass is included, an average length of the second sealing portion is 20 μm or more under heat treatment conditions t1 to t3. On the other hand, it can be seen that in Comparative Example 1 in which glass is not included, the second sealing portion is not formed.

Table 2 is data showing moisture resistance reliability evaluation results of Inventive Examples 1 to 3 and Comparative Example 1 of Table 1, and a moisture resistance reliability evaluation (8585 test) was performed on 750 samples for each of Inventive Examples 1 to 3 and Comparative Example 1. Here, in the moisture resistance reliability evaluation, a voltage of 1.5 Vr was applied to each sample at a temperature of 85° C. and a relative humidity of 85% for 100 hours.

Low indicates the number of samples whose insulation resistance has decreased from initial insulation resistance by 1.00E+01 or more, and Overload indicates the number of samples whose insulation resistance has decreased from the initial insulation resistance by 1.00E+03 or more.

TABLE 2

| Experimental Example | | Inventive Example 1 | Inventive Example 2 | Inventive Example 3 | Comparative Example 1 |
|---|---|---|---|---|---|
| Paste | | A | A | A | B |
| Heat Treatment Condition | | t1 | t2 | t3 | t3 |
| Moisture Resistance Reliability Evaluation (8585 Test) | Low (Number) | 1/750 | 0/750 | 0/750 | 5/750 |
| | Overload (Number) | 2/750 | 1/750 | 1/750 | 5/750 |

Referring to Table 2, it may be seen that in Comparative Example 1, Overload is 5/750 and Low is 5/750, such that a moisture resistance reliability failure frequency is high, and thus there is a problem in reliability.

On the other hand, it can be seen that in Inventive Examples 1 to 3, which are cases where the length of the second sealing portion satisfies a numerical range according to the present disclosure, a multilayer electronic component having excellent moisture resistance reliability may be implemented.

Therefore, a moisture resistance reliability improvement effect may be determined as an influence of the second sealing portion formed within the numerical range according to the present disclosure.

As set forth above, according to an exemplary embodiment in the present disclosure, the moisture resistance reliability of the multilayer electronic component may be improved by disposing the sealing portions or the diffusion portions to block the permeation of the moisture.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
   a body including a plurality of dielectric layers and a plurality of internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
   external electrodes disposed on external surfaces of the body and connected to the internal electrodes; and
   sealing portions disposed on outer surfaces of the body,
   wherein the external electrodes and the sealing portions include glass,
   the sealing portions include first sealing portions that are disposed between the body and the external electrodes, and second sealing portions that extend from the first sealing portions in the second direction and are not in contact with the external electrodes, and
   an average length of the second sealing portions is 20 μm or more.

2. The multilayer electronic component of claim 1, wherein an average thickness of the second sealing portions at a distal end of the external electrodes is 1 μm or more.

3. The multilayer electronic component of claim 1, wherein an average thickness of the second sealing portions becomes smaller as the second sealing portions becomes more distant from the first sealing portions in the second direction.

4. The multilayer electronic component of claim 1, wherein an average thickness of the first sealing portions is 1 μm or more.

5. The multilayer electronic component of claim 1, wherein the sealing portions are disposed except for portions where the internal electrodes and the external electrodes are connected to each other.

6. The multilayer electronic component of claim 1, wherein the sealing portions are disposed on an entirety of outer surfaces of the body, but are disposed except for portions where the internal electrodes and the external electrodes are connected to each other.

7. The multilayer electronic component of claim 1, wherein the body includes diffusion portions in contact with the sealing portions and disposed on inner surfaces of the body, and
the diffusion portions include first diffusion portions in contact with the first sealing portions and second diffusion portions in contact with the second sealing portions.

8. The multilayer electronic component of claim 7, wherein the diffusion portions includes glass.

9. The multilayer electronic component of claim 8, wherein the glass of the diffusion portions is disposed at a dielectric crystal grain boundary.

10. The multilayer electronic component of claim 7, wherein an average thickness of the second diffusion portions at a distal end of the external electrodes is 5 μm or more.

11. The multilayer electronic component of claim 7, wherein an average thickness of the second diffusion portions becomes smaller as the second diffusion portions becomes more distant from the first diffusion portions in the second direction.

12. The multilayer electronic component of claim 7, wherein |L1−L2|≤1 μm in which L1 is the average length of the second sealing portions, and L2 is an average length of the second diffusion portions.

13. The multilayer electronic component of claim 7, wherein an average thickness of the first diffusion portions is 5 μm or more.

14. The multilayer electronic component of claim 7, wherein the diffusion portions are disposed except for portions where the internal electrodes and the external electrodes are connected to each other.

15. The multilayer electronic component of claim 7, wherein the diffusion portions are disposed on an entirety of inner surfaces of the body, but are disposed except for portions where the internal electrodes and the external electrodes are connected to each other.

16. The multilayer electronic component of claim 1, wherein the external electrodes include:
first electrode layers including a first conductive material and glass; and
second electrode layers disposed on the first electrode layers and including a second conductive material and a resin, and
the first and the second conductive materials include one or more selected from the group consisting of copper (Cu), nickel (Ni), palladium (Pd), silver (Ag), and alloys thereof.

17. The multilayer electronic component of claim 1, wherein the external electrodes further include plating layers formed on the external electrodes, and
the plating layers include one or more selected from the group consisting of nickel (Ni), tin (Sn), palladium (Pd), and alloys thereof.

18. A multilayer electronic component comprising:
a body including a plurality of dielectric layers and a plurality of internal electrodes alternately disposed with the dielectric layer interposed therebetween in a first direction and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
external electrodes disposed on external surfaces of the body and connected to the internal electrodes;
margin parts disposed on opposite end surfaces of an active part in the third direction, respectively; and
sealing portions disposed on outer surfaces of the body, and including first sealing portions that are disposed between the body and the external electrodes, and second sealing portions that extend from the first sealing portions in the second direction and are not in contact with the external electrodes;
cover portions disposed on opposite end surfaces of the active part in the first direction, respectively; and
diffusion portions in contact with the sealing portions and disposed on inner surfaces of the body, and including first diffusion portions in contact with the first sealing portions and second diffusion portions in contact with the second sealing portions,
wherein the external electrodes, the sealing portions, and the diffusion portions include glass.

19. The multilayer electronic component of claim 18, wherein an average size of the cover portions in the first direction is 20 μm or less.

20. The multilayer electronic component of claim 18, wherein an average size of the margin parts in the third direction is 20 μm or less.

* * * * *